United States Patent
Chan et al.

(10) Patent No.: US 7,697,252 B2
(45) Date of Patent: Apr. 13, 2010

(54) OVERVOLTAGE DEVICE WITH ENHANCED SURGE SUPPRESSION

(75) Inventors: David Y Chan, Bellrose, NY (US); Roger M. Bradley, North Bellmore, NY (US); John J Power, Westbury, NY (US)

(73) Assignee: Leviton Manufacturing Company, Inc., Little Neck, NY (US)

( * ) Notice: Subject to any disclaimer, the term of this patent is extended or adjusted under 35 U.S.C. 154(b) by 230 days.

(21) Appl. No.: 11/839,511

(22) Filed: Aug. 15, 2007
(Under 37 CFR 1.47)

(65) Prior Publication Data
US 2009/0046406 A1  Feb. 19, 2009

(51) Int. Cl.
*H02H 1/00* (2006.01)
(52) U.S. Cl. ..................................... 361/128
(58) Field of Classification Search ............... 361/111, 361/128
See application file for complete search history.

(56) References Cited

U.S. PATENT DOCUMENTS

| | | | | |
|---|---|---|---|---|
| 3,611,044 A | * | 10/1971 | Osterhout et al. ........... | 361/128 |
| 3,733,520 A | | 5/1973 | Shei | |
| 4,174,530 A | * | 11/1979 | Kresge et al. .............. | 361/127 |
| 4,240,124 A | | 12/1980 | Westrom | |
| 4,400,754 A | * | 8/1983 | Schweickardt .............. | 361/38 |
| 4,472,754 A | | 9/1984 | Mizukoshi et al. | |
| 4,520,239 A | | 5/1985 | Schwartz | |
| 4,685,634 A | | 8/1987 | Schwartz | |
| 4,705,342 A | | 11/1987 | Schwartz | |
| 4,726,991 A | | 2/1988 | Hyatt et al. | |
| 4,869,688 A | * | 9/1989 | Merio ........................ | 439/504 |
| 4,908,730 A | | 3/1990 | Westrom | |
| 5,208,723 A | | 5/1993 | Jenne | |
| 5,210,676 A | | 5/1993 | Mashikian | |
| 5,233,498 A | * | 8/1993 | Kansala ...................... | 361/130 |
| 5,383,085 A | | 1/1995 | Boy et al. | |
| 5,394,374 A | | 2/1995 | Ishimura et al. | |
| 5,559,663 A | | 9/1996 | Tanaka et al. | |
| 5,594,613 A | | 1/1997 | Woodworth et al. | |
| 5,596,308 A | | 1/1997 | Bock | |
| 5,617,288 A | | 4/1997 | Zaretsky | |
| 5,654,857 A | | 8/1997 | Gershen | |
| 5,781,393 A | * | 7/1998 | Tabib-Azar et al. ......... | 361/118 |
| 5,786,974 A | | 7/1998 | Zaretsky | |
| 5,892,669 A | | 4/1999 | Shin | |

(Continued)

OTHER PUBLICATIONS

"Health Care Facilities Wiring Device Products Bulletin"—Leviton Manufacturing Company, Inc., published Jul. 2006, 24 pages.

(Continued)

*Primary Examiner*—Ronald W Leja
(74) *Attorney, Agent, or Firm*—Collard & Roe, P.C.

(57) ABSTRACT

An overvoltage device that is formed from a MOV device that is coupled in parallel with a spark gap. This device is coupled upstream from electronic components to protect these components from damage. For example, in one embodiment, the overvoltage device is coupled to a fault circuit interrupter such as a GFCI, across the phase and neutral lines to protect components of the GFCI from an overvoltage condition. In one embodiment the overvoltage device is formed as an MOV physically coupled to a spark gap wherein the MOV and the spark gap are electrically coupled across the phase line and the neutral line in parallel.

22 Claims, 7 Drawing Sheets

U.S. PATENT DOCUMENTS

| | | | |
|---|---|---|---|
| 5,901,027 A | 5/1999 | Ziegler et al. |
| 6,069,781 A | 5/2000 | Wingate et al. |
| 6,088,205 A | 7/2000 | Neiger |
| 6,094,128 A | 7/2000 | Bennett et al. |
| 6,128,169 A | 10/2000 | Neiger |
| 6,160,692 A | 12/2000 | Zaretsky |
| 6,172,865 B1 | 1/2001 | Boy et al. |
| 6,211,770 B1 | 4/2001 | Coyle |
| 6,252,488 B1 | 6/2001 | Ziegler et al. |
| 6,342,998 B1 | 1/2002 | Bencivenga et al. |
| 6,421,218 B1 | 7/2002 | Vo et al. |
| 6,462,318 B2 | 10/2002 | Furuuchi et al. |
| 6,606,232 B1 | 8/2003 | Vo et al. |
| 6,608,547 B1 | 8/2003 | Grier et al. |
| 6,636,403 B2 | 10/2003 | McLoughlin et al. |
| 6,692,270 B2 | 2/2004 | Bencivenga et al. |
| 6,717,782 B2 | 4/2004 | DiSalvo et al. |
| 6,900,972 B1 | 5/2005 | Chan et al. |
| 7,012,500 B2 | 3/2006 | Chan et al. |
| 7,082,021 B2 | 7/2006 | Chan et al. |
| 7,161,786 B2 | 1/2007 | Bencivenga et al. |
| 7,187,526 B2 | 3/2007 | Disalvo |
| 7,242,566 B2 | 7/2007 | Yegin et al. |
| 2001/0015686 A1 | 8/2001 | McLoughlin |
| 2001/0055187 A1 | 12/2001 | Mcloughlin et al. |

OTHER PUBLICATIONS

"Power Quality Products"—Leviton Manufacturing Company Inc., published 2003 16 pages.

"Technical and Applications Manual for Power Quality Products" -Leviton Manufacturing Company Inc., published 2003, 66 pages.

"Metal Oxide Varistor Degradation"—Leviton Manufacturing Company Inc., published Mar. 2004, 7 pages.

"Multimedia Residential Surge Protector Panel"—Leviton Manufacturing Company Inc., *Product Bulletin for Catalog No. 5111-PTC & 51110-CT8*, published in 2003, 2 pgs.

"Leviton's New Uninterrruptible Power Supply (UPS) "Strip" Models"—Leviton Manufacturing Company Inc., *Product Bulletin for Catalog Nos. U0330-KO, U0500-SKO*, published in 2000 , 2 pages.

* cited by examiner

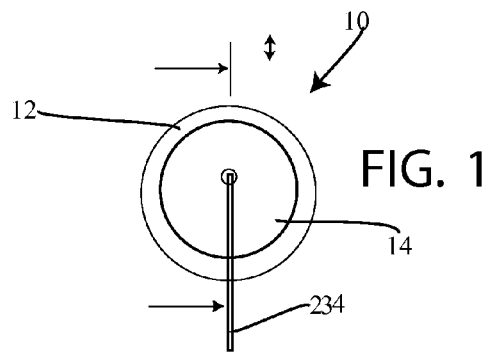
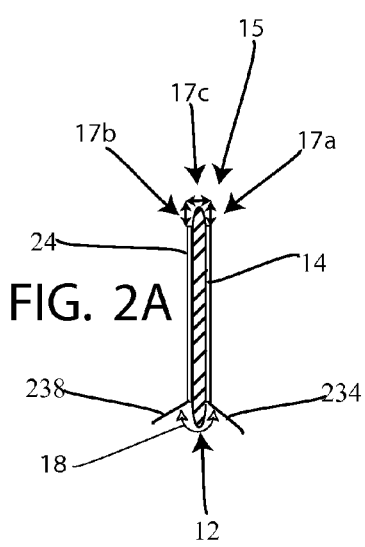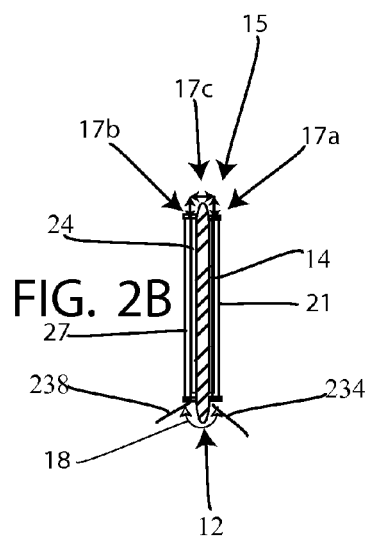
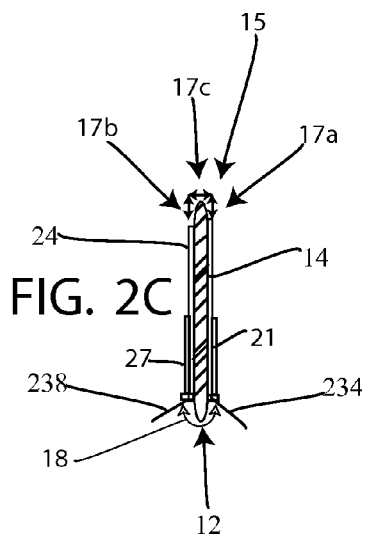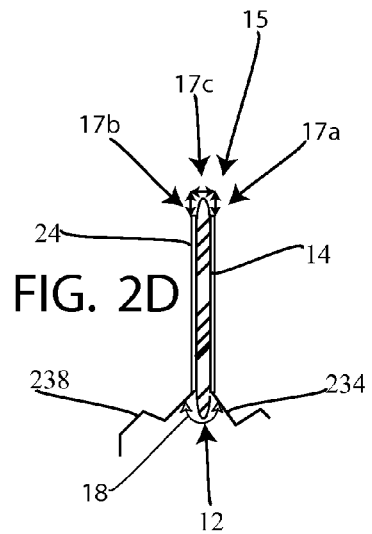

OVERVOLTAGE DEVICE WITH ENHANCED SURGE SUPPRESSION

BACKGROUND OF THE INVENTION

The present invention relates generally to an overvoltage protection device comprising a metal oxide varistor (MOV) that can modify its operating characteristics to protect a ground fault circuit interrupter during the occurrence of an overload voltage surge.

There is a need to protect AC line powered electronics from voltage spikes. One of the most popular methods of surge suppression is the metal oxide varistor (MOV). The surge suppression requirements for AC line powered electronics have increased in recent years. For example, UL testing now requires ground-fault circuit interrupters GFCIs to survive and function normally after several 6 kV, 3 kA voltage surges. It is also required that any surge suppression device for a GFCI must either survive, or self destruct in a safe manner, when a 10,000 amp current surge is applied. A MOV that is 14 or 20 mm in diameter is typically required to have the joule capacity to survive these high voltage, high current surges. At the same time however, circuit interrupter receptacles and plug-in units are required to be small for aesthetic and practical reasons. In particular, receptacle interrupters must fit into standard size wall boxes.

MOVs are bi-polar ceramic semiconductor devices. They act as an open circuit as long as the voltage across them is less than their maximum continuous operating voltage (MCOV). Above their MCOV, MOVs operate as non-linear resistors with a resistance that decreases as the voltage across them increases. This makes MOVs an effective solution for protecting downstream electronics from over-voltages and voltage transients. Since a MOV is open-circuit during normal operating voltages, it does not consume current. However, during voltages transients above the MCOV, it quickly shunts current away from the downstream electronics. In addition, since it is a bi-polar device it can protect electronics from negative and positive voltage transients.

A typical MOV consists of a ceramic mass of zinc oxide grains (mixed with small amounts of metal oxides) placed between two metal electrodes. The shape of the ceramic mass is typically a disk shape with the metal electrodes on the two flat surfaces, though larger MOVs can be square with rounded corners or even toroids. For smaller MOVs (53 mm diameter and less) a lead is soldered to each electrode and the MOV is encapsulated in epoxy or other insulative material.

Clearly there is a need for improved surge suppression techniques that take up a relatively small volume, clamp at low enough voltage to protect 120/240 v circuits adequately and are resistant to catastrophic failure during high current surges.

This is because a high voltage transient surge can totally or partially damage electrical devices such as Ground Fault Circuit Interrupters (GFCIs) located in homes, factories and commercial buildings. In many instances, the damage can cause only the protective features of the GFCIs to become either partially or fully inoperative while the device itself continues to conduct electricity. Thus, a user of this type of GFCI could still obtain power from the face terminals of a GFCI but not receive the GFCI type protection.

In operation, an MOV is connected in parallel with the device that is to be protected such as but not limited to a GFCI. At low voltages the MOV has a very high resistance. At high voltages, the varistor has a very low resistance so that when a high voltage transient surge appears on the power supply line, the MOV, which appears as a low resistance, prevents the transient voltage surge from reaching the device. As stated above, conduction through an MOV begins when the voltage across the MOV reaches a maximum continuous operating voltage, referred to as the varistor voltage. As the voltage increases, the MOV's resistance drops rapidly and may approach zero. Because the resistance of the MOV decreases as the voltage increases, the MOV diverts transient current through itself and not through the device that is connected in parallel with and down stream of the MOV. After the occurrence of the voltage transient surge, the MOV returns to its normal high resistance state and is ready for the next high voltage surge.

However, another characteristic of an MOV is that during operation, the MOV will increase in temperature as it conducts high voltage surges. If the voltage surges are well spaced, the MOV can cool down between events. However, if the events are closely spaced, the MOV will not have enough time to cool down and this heating of the MOV will allow additional current to flow through the MOV. The additional current will further raise the temperature of the MOV, and this will continue until the MOV destroys itself. This condition is known as thermal runaway. When in its thermal runway state, an MOV can explode and possibly cause extensive damage to surrounding components.

One way of protecting the MOV itself is with a thermal protection device wired in series with and located to be heated by the MOV element. The melting point of the thermal protection device is set to be at a temperature below that which will cause the MOV to enter its thermal runaway state. As the temperature of the MOV rises, a point will be reached where the thermal protection device will melt and disconnect the MOV from the circuit. When the circuit is a GFCI, it will no longer be protected by the MOV and the full impact of the high voltage transient pulse will be applied to the GFCI. Thus, when an overload condition occurs, the over voltage transient surge is free to be absorbed by the GFCI that was being protected.

The peak surge current rating of an MOV is a function of the area of the disc itself. To protect a GFCI from destructive high voltage transient surges, test have shown that a relatively large MOV is needed. Unfortunately, it is difficult to connect an MOV of this size to a GFCI and still fit the GFCI and the MOV into a single outlet box.

What is needed is an overvoltage device which can protect a circuit during an overload voltage surge, that is small enough to fit into a relatively small enclosure such as a single gang electrical enclosure.

SUMMARY OF THE INVENTION

One embodiment of the invention relates to a fault circuit interrupter having an overvoltage device in the form of a MOV element that is connected such that it forms a MOV element in parallel with a spark gap. The MOV element is physically and electrically connected to a spark gap, wherein when the voltage rises to a level that provides a temperature below that at which the MOV will enter into its thermal runaway state the spark gap acts to allow this excess overvoltage to dissipate by extending across the spark gap, thereby relieving the heat pressure put on the MOV. In this case, the spark gap material is located on the a surface of the MOV and is electrically connected in parallel with the MOV. Generally, when a high voltage surge crosses the MOV, the components of the MOV heat up. The higher the voltage in the surge, the greater the heat created in the MOV. In addition, the higher the voltage of the surge, the greater the chance for the use of a spark gap which is adapted to react in the case of large voltage differences between two plates on an MOV forming a spark gap.

Therefore, as a voltage surge occurs on this MOV, if this voltage surge is greater than a minimal threshold value, the spark gap will be acted on by this excess voltage to allow the voltage to dissipate before the MOV heats to a breakdown state. Thus, this spark gap is electrically connected in parallel with the MOV element to help dissipate excessive voltage. In addition, in one embodiment, the spark gap can be covered with a heat sensitive material on the surface of the MOV such as an insulator element which can be a coating of epoxy which cracks and/or breaks away, at least partially from the surface of the MOV element during the occurrence of a high voltage transient surge, or it can be a solder that sputters to form an arc path during the occurrence of a high voltage transient surge. In operation, when a GFCI is subjected to a high voltage transient surge above a certain magnitude, the heat sensitive material forms a spark gap which is in parallel with the MOV and prevents the GFCI from going into its thermal runaway condition.

Thus, prior to the MOV entering its thermal runaway state, it goes from being only an MOV to an MOV in parallel with a spark gap which can be used to protect a set of downstream components during the occurrence of a high voltage transient surge.

With this design, the size and shape and distance between the metal components forming the spark gap can be adjusted to adjust the threshold voltage at which the spark gap becomes operational. The threshold voltage is set so that the spark gap becomes operational at a voltage level that is below a level that would generate sufficient heat to destroy a MOV. In this case, during surges with high voltage conditions, a high voltage potential across an MOV would generate a relatively high current which would result in the heating and eventual destruction of the MOV. When this spark gap becomes operational, it shunts this surge current around the MOV such that much of the current passes around the spark gap rather than across the MOV. In addition with this design, once the spark gap is operational above the threshold voltage, the higher the voltage, the greater the percentage of current that passes through the spark gap rather than the MOV, thereby protecting the MOV.

In addition, with the coupling in of the spike or spark gap, the size of the MOV can be reduced such that the MOV only needs to function in a pre-defined range with the remaining excess voltage being handled by a spark gap coupled in parallel with this MOV to form a compact overvoltage device. Furthermore, additional MOV devices or redundant MOVs are now not required because this type of MOV is protected via the incorporated spark gap which is coupled in parallel to the MOV.

Thus, because these two components forming the overvoltage device, the MOV and the spark gap which are coupled in parallel, the MOV can be saved from any extreme overvoltage spikes due to the parallel positioning of the spark gap.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a side view of an overvoltage device;

FIG. 2A is a cross-sectional view of the overvoltage device as shown in FIG. 1 and taken through the line I-I;

FIG. 2B is a cross-sectional view of a second embodiment of the overvoltage device;

FIG. 2C is a cross sectional view of a third embodiment of the overvoltage device;

FIG. 2D is a cross-sectional view of a fourth embodiment of the overvoltage device;

DETAILED DESCRIPTION

Figure 3A:
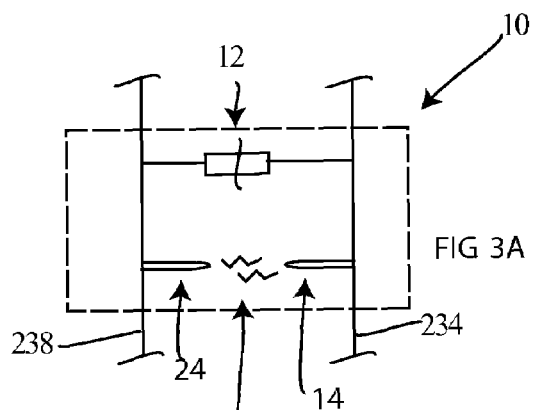
FIG. 3A is a schematic layout of the overvoltage device in parallel with a spark gap between a phase line and a neutral line.

Referring to FIG. 1, there is shown a side view of an overvoltage protection device 10 which includes a MOV 12, having a body which can be of any shape but is shown here as disc shaped, and essentially as a solid disc. Coupled to this body is an electrically conductive material such as a conductive region in the form of a coating or plate 14 which is coupled to a first side or surface of MOV disc 12. MOV 12 having at least a first side have a surface and at least a second side having a surface. On the opposite or second side surface is a conductive coating or plate 24 (See FIG. 2A). Conductive coating or plate 24 is formed in a similar manner as conductive coating or plate 14.

For example, the first and second conductive regions are in the form of the metal coating or plate 14 and 24 that are coupled to MOV disc 12 via any known adhesive or via deposition of metal such as via any known deposition technique such as for example vapor deposition. Conductive region 14 is attached to MOV disc 12 such that it forms a gap region 17a (See FIGS. 2A, 2B, 2C, 2D) between an end point of conductive region 14 and a remaining length section of MOV disc 12. The dimensions and distances between the conductive regions are noted by distances 17a, 17b, and 17c wherein distance 17a is a first distance from an end of conducive region 14 that can be varied based upon the size or geometry of conductive region 14. Distance 17b is a second distance from an end of conductive region 24 to a perimeter region of MOV 12 that can be varied based upon the geometry of conductive region 24. Distance 17c is the distance across the width of MOV 12 which is controlled by the width of this MOV 12 or any particular elements coupled between conductive regions 14 and 24. The entire distance that any spark or current would travel is the distance from a first conductive region 14, around MOV 12 to the second conductive region 24 as shown by way of example as reference numeral 18 which is essentially the distance controlled by distances 17a, 17b, and 17c.

This gap region can be varied to any degree desirable so as to form a spark gap 15 which has particular overvoltage properties. As shown in FIGS. 2A-2D, because the arcing would travel around an outer region of the solid body of MOV 12, this spark gap is essentially formed on a periphery of MOV 12.

FIG. 2A also shows that the overvoltage device 10 is coupled at a first end to a first or line 234, and at a second end to a second line 238. In many cases, the MOV can be coupled between any two lines such as between a phase an neutral line, a phase line and a ground line or between a neutral line and a ground line. (See FIGS. 3A, 3B, and 3C). In at least one embodiment, a phase line 234 and a neutral line 238 are associated with a fault circuit interrupting device such as a GFCI shown in FIGS. 6 and 7. Power is fed through phase line 234 and under normal operating conditions, the current from phase line 234 does not pass through overvoltage device 10 to neutral line 238. The positioning of metal plates 14 and 24 is such that the distances around MOV 12 are set so that the spark gap 15 will only act under certain predetermined conditions such as at a voltage below the voltage necessary for the thermal breakdown of MOV 12.

FIG. 2B shows a cross-sectional view of another embodiment of the device wherein with this design, the spark gap 15 formed by the conductive regions 14 and 24 is covered by an insulative material 21 and 27 such as an epoxy. This insulative material has a thermal breakdown level that is below the thermal breakdown level of the MOV. Therefore, when a high voltage surge hits this overvoltage device 10, if this voltage is in excess of the thermal breakdown level of the insulative material, then it destroys the insulative material 21, or 27, thereby creating an opening for a spark gap 15 formed from conductive plates 14 and 24.

FIG. 2C shows a cross-sectional view of another embodiment of the invention wherein in this embodiment the insulative material 21a and 27a covers only a portion of the metal plate or conductive material 14 and 24 to control the arc path or arc trace created by the spark gap. With this type of design, this coating can be varied at different positions to optimize the effect of the path of the spark gap. In addition, because at least a portion of the conductive material 14 and 24 is exposed this insulative material 21a and 27a can have a thermal breakdown level that is above the threshold level or breakover level for the spark gap thereby continuously directing the arcing across the spark gap. In this case, if a spark or arc formed from spark gap 15 extended into an unwanted region then this arcing could result in unwanted further damage to electronic components. Therefore, in this embodiment selective coating in only a portion of the conductive regions 14 and 24 is provided so that arcing can instead continue unimpeded across an uncoated spark gap region.

FIG. 2D shows another embodiment of the invention wherein the lead lines 234 and 238 are crimped or kinked so as to prevent unwanted arcing from any one of these lines. This kinking prevents unwanted arcing to the MOV leads. With all of the designs shown in FIGS. 2A-2D, MOV 12 has an energy capacity, wherein the spark gap 15 that is formed is designed to activate or have a breakover voltage, that results in arcing across the spark gap, at a voltage level that is below the voltage level required to exceed the energy capacity of the MOV. Essentially this energy capacity is the amount of energy that the MOV can absorb without being detrimentally altered in a noticable or significant manner which would then alter the properties of the MOV.

Figure 3B:
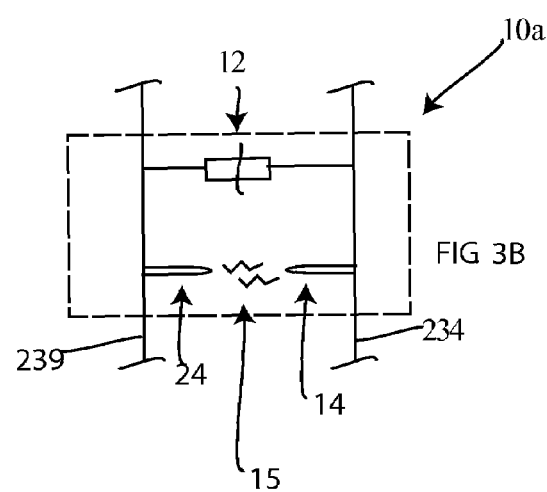
FIG. 3B is a schematic layout of the overvoltage device in parallel with a spark gap between a phase line and a ground line.
Figure 3C:
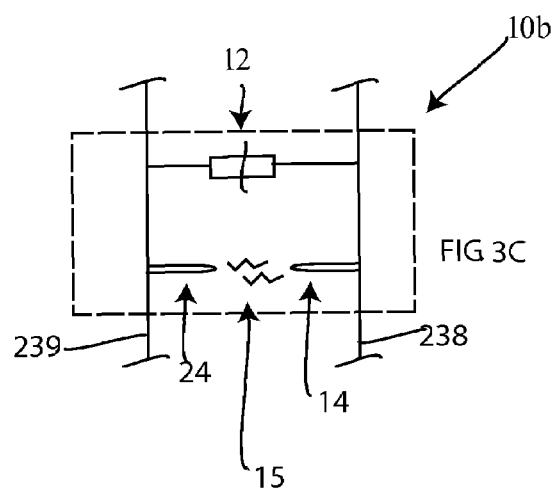
FIG. 3C is a schematic layout of the overvoltage device in parallel with a spark gap between a neutral line and a ground line.

FIG. 3A shows a schematic block diagram of one embodiment of the invention wherein with this embodiment, the overvoltage device 10 has a MOV 12 shown schematically which is coupled in parallel with spark gap 15 formed by ends of conductive regions 14 and 24. In this embodiment, the overvoltage device 10 as shown in FIG. 1 operates as a combined MOV and spark gap device coupled in parallel with each other. With this design, one end of the MOV and spark gap is coupled to phase line 234, and another end of the MOV and spark gap is coupled to neutral line 238. Alternatively as shown in FIG. 3B, an overvoltage device 10a is coupled between a phase line 234 and a ground line 239, or as shown in FIG. 3C an overvoltage device 10b is coupled between a neutral line 238 and a ground line 239. Other means for coupling an MOV between two contacts are also possible such as any two conductors where a potential difference occurs.

This type of MOV can, in at least one form, be incorporated into a GFCI which has enhanced surge suppression, however, this type of MOV may be beneficial to any number of electrical devices. For example, the embodiments shown in FIGS. 1-4 can be coupled to a GFCI type device explained in greater detail in commonly owned U.S. Pat. No. 7,012,500, to Chan et al which issued on Mar. 14, 2006, the disclosure of which is hereby incorporated herein by reference in its entirety. This MOV device can also be incorporated into other fault circuit devices such as arc fault circuit devices as well such as in the following commonly owned U.S. Patents: U.S. Pat. No. 6,088,205 to Neiger et al issued on Jul. 11, 2000; U.S. Pat. No. 6,128,169 to Neiger et al issued on Oct. 3, 2000; and U.S. Pat. No. 6,717,782 to DiSalvo et al, the disclosures of which are hereby incorporated herein by reference.

Figure 4:
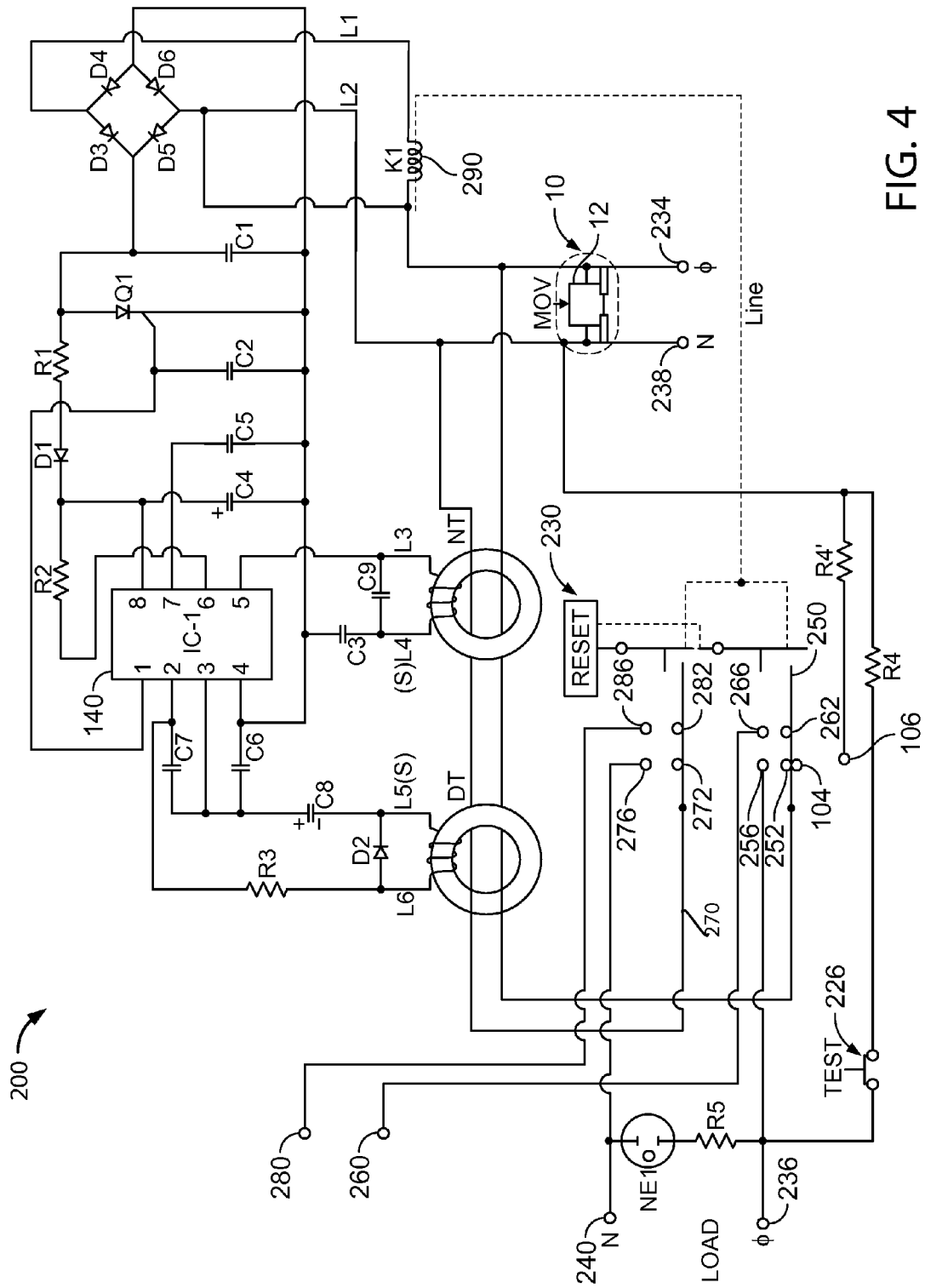
FIG. 4 is a circuit diagram of the overvoltage device coupled to a fault circuit interrupter.

As shown in FIG. 4, both the MOV and the spark gap isolate phase line 234 from neutral line 238. However, during the occurrence of an overvoltage condition, such as during a voltage spike on either phase line 234 or a voltage spike on neutral line 238, current will pass from phase line 234 to neutral line 238 in this region, to prevent downstream circuitry from being harmed from high voltages during this overvoltage condition. At times of peak overvoltage conditions, excess current crosses from either one of lines 234 or 238 either using MOV 12 alone or through spark gap 15 and MOV 12 if the amount of voltage exceeds a pre-defined overvoltage level.

Thus, FIG. 4 shows a schematic block diagram of the overvoltage device 10 such as shown in FIG. 1 incorporated into a single element formed by both a MOV 12 and a spark gap 15 coupled in parallel across phase line 234 and neutral line 238 of a GFCI. The positioning of this overvoltage device 10 thereby prevents an occurrence of an overvoltage condition from destroying the circuitry of a fault circuit interrupter. The remaining components of the fault circuit interrupter are described in greater detail in U.S. Pat. No. 7,012,500 to Chan and commonly owned U.S. Pat. No. 7,187,526 to DiSalvo disclosure of which is hereby incorporated herein by reference in its entirety.

For example, FIG. 4 shows a circuit diagram for a standard fault circuit interrupter that has now been modified by coupling overvoltage protector 10 across phase line 234 and neutral line 238. This fault circuit includes a plurality of capacitors C1, C2, C3, C4, C5, C6, C7, and C8, a series of diodes D1, and D2, along with another series of diodes D3, D4, D5 and D6 forming a rectifier, a coil K1, a differential transformer DT and a neutral transformer NT, a silicon controlled rectifier (SCR) Q1, a series of resistors R1, R2, R3, R4, R4', and R5, and an indicator light such as a neon light NE1. This light NE1 is lit when power is provided to load contacts 236 and 240.

This circuit has a test button 226, and a reset button 230, such that when either button is pressed it acts upon the circuit to change its state. For example, when the reset button is pressed, a circuit is therefore created with top rectifier (D3, D4, D5 and D6) and resistor R4' where a current flows through R4' from the positive point of the top rectifier to the negative point of the top rectifier. The current through R4' is detected by differential transformer DT causing integrated circuit (IC) 140 to drive Q1 which shorts R1 and C1 to ground thereby activating relay or coil K1 which causes electrically nonconductive reset arm to kick to move breaking the circuit comprising R4' and the top rectifier. A spring kicks the reset arm back with the levers now positioned below their respective wiper arms because the reset button is still being pressed. Alternatively, when the test button 226 is activated, power flows through the rectifier formed by D3, D4, D5, and D6, thereby supplying power to coil K1 driving pin 290 to trip, causing movable contacts 252 and 262, on contact arm 250, (See FIG. 5) and movable contacts 272 and 282 on contact arm 270 to move away from stationary or fixed contacts 256 and 266, or 276 and 286 respectively thereby opening the circuit. Similarly, when a fault is detected using either differential transformer, DT or differential transformer NT or both, IC 140 sends a signal to SCR Q1 to rectifier (D3, D4, D5, D6) which then causes coil assembly 290 to trip as described above to open the respective contacts.

The placement of this overvoltage device 10 is designed to protect these valuable and sensitive components from an overvoltage surge which could disable many of the above described components. For example, if an overvoltage surge passed through either phase line 234 or neutral line 238 this surge could damage IC 140 thereby rendering the fault circuit detection unusable. At this point, a user would not have any indication that the IC 140 was damaged and yet would not have any fault circuit protection due to the damaged integrated circuit. Depending on the configuration necessary, the different implementations disclosed in FIGS. 2A-2D can be selectively used to create a MOV in parallel with a spark gap that has particular arcing characteristics.

Figure 5:
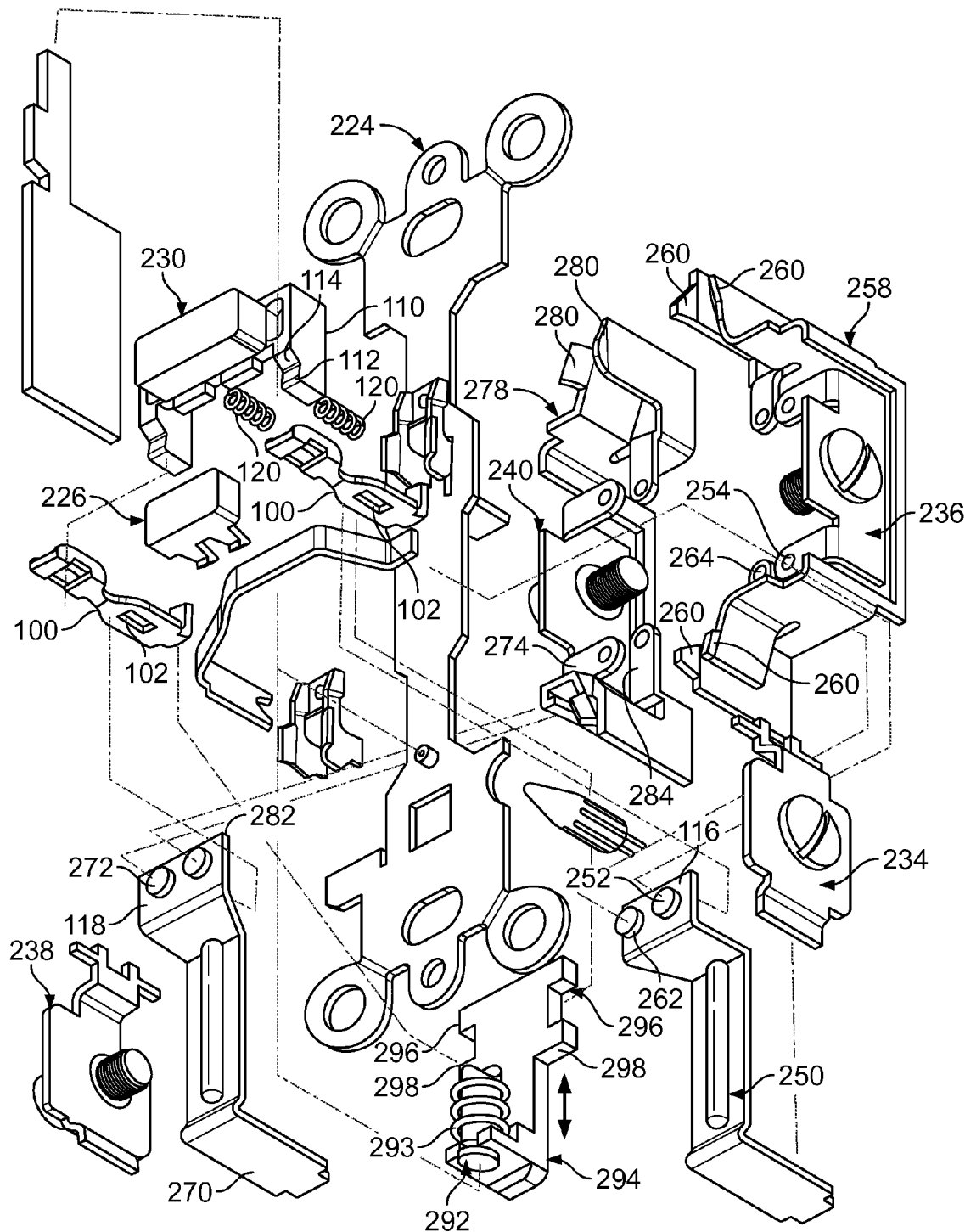
FIG. 5 is an exploded view of a fault circuit interrupter.
Figure 6:
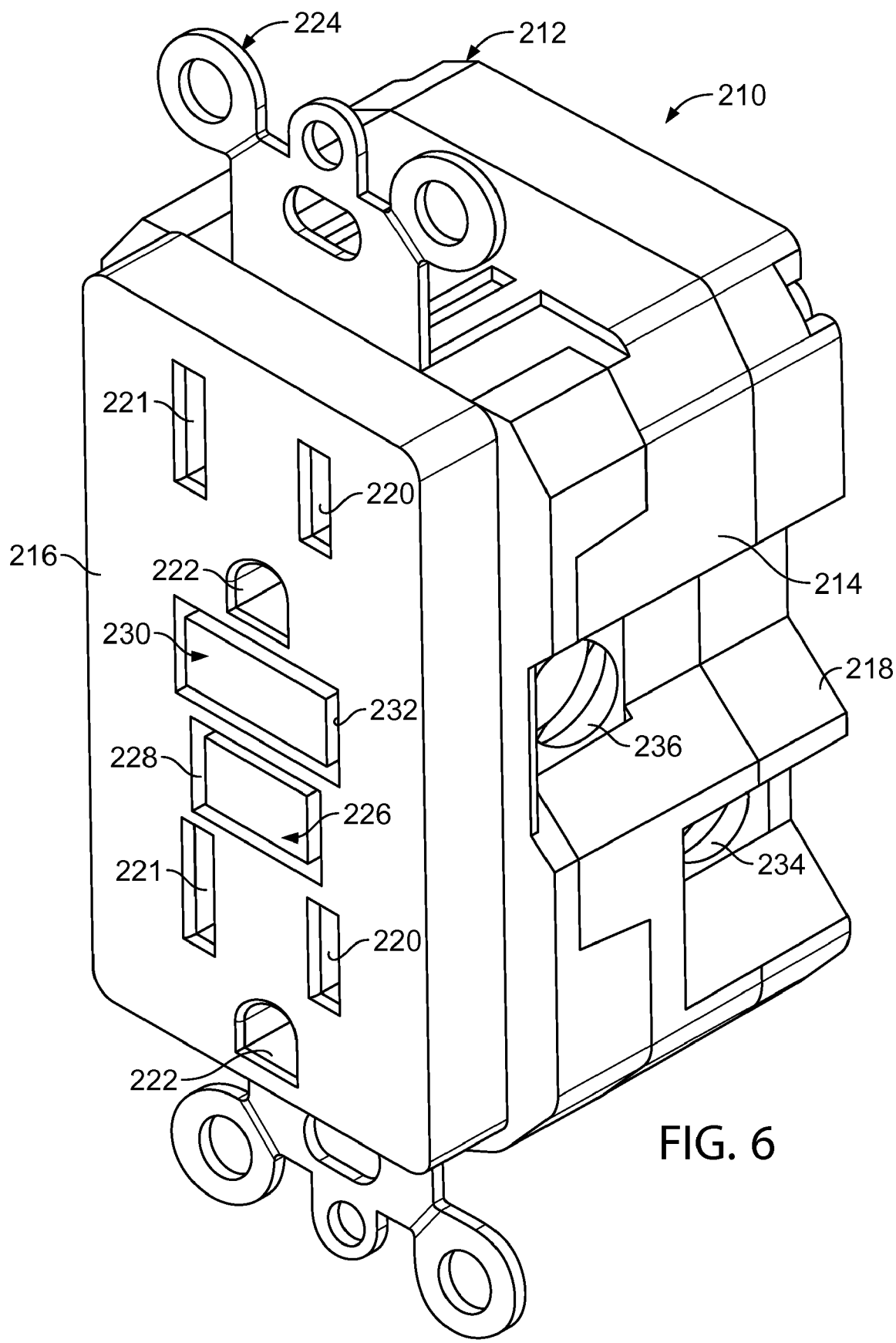
FIG. 6 is a perspective view of an assembled fault circuit interrupter.
Figure 7:
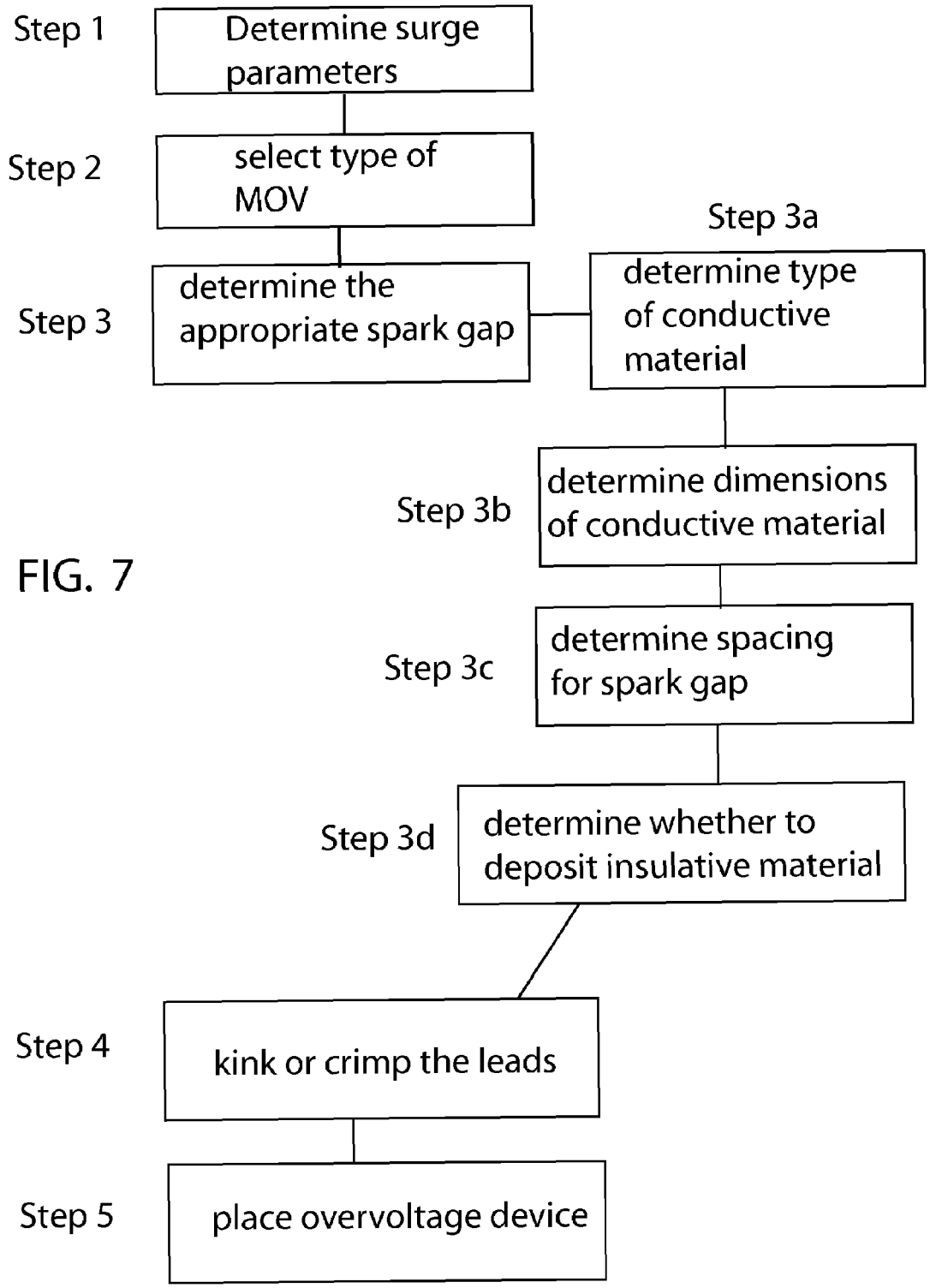
FIG. 7 is a flow chart for a series of steps for creating the overvoltage device.

The examples shown in FIGS. 4-6 show that this overvoltage device can be coupled into a fault circuit interrupter 210 in the form of a single gang electrical enclosure such as that shown in FIG. 6. However, the implementation examples described above are just some of the many different possible implementations for this device.

In addition, the overvoltage device can be designed or manufactured in such a manner so as to optimize the size and functionality of the device. For example, during a user or manufacturer can first determine in step 1 the appropriate surge parameters. Next, in step 2, selects the type of MOV is selected. Next, in step 3 the appropriate spark gap is determined. This step can include a series of steps such as step 3a which includes selecting the type of material for the conductive coating or plate to place on the MOV. Different conductive materials such as copper or copper alloys, aluminum, lead, tin, solder, or other conductive materials can be used to optimize the spark gap characteristics of this overvoltage device. Furthermore, in step 3b the the dimensions of this coating or plate such as the thickness and the surface area of the coating or plate can be determined. Next, in step 3c the spacing available or created for a spark gap based upon the amount of surface area for the metal coating, can be determined. For example, the manufacturer or user can determine the dimensions such as those shown in FIG. 2A as 17a, 17b and 17c to determine the necessary distance for arcing between conductive sections 14 and 24 forming a spark gap. Next, in step 3d the manufacturer can next determine whether to deposit any insulative material onto the conductive material to either insulate and protect the MOV or to control the arc tracing or arc path of the MOV device. Next, in step 6, the manufacturer can kink or crimp the leads on the MOV device in any suitable manner so as to reduce any undesired arcing between the leads and the conductive material. Finally, in step 7, the manufacturer can decide where and whether to place the MOV on a fault circuit such as a GFCI an AFCI or any other type of electrical device. This step of placing the device can include placing the device in a partial or entire housing such as the housing shown in FIG. 8.

Figure 8:
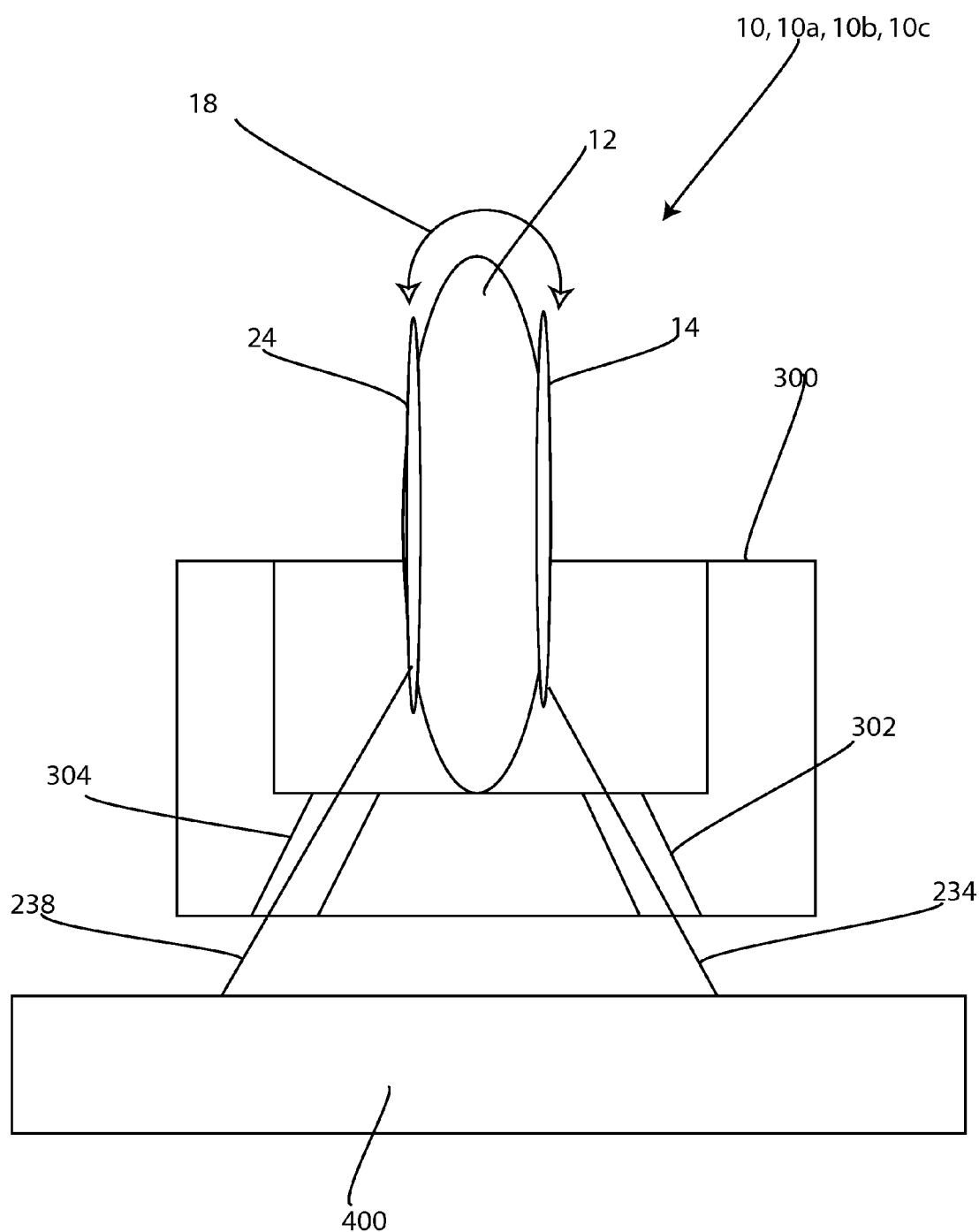
FIG. 8 is a cross sectional view of a housing used to house the overvoltage device.

FIG. 8 shows a cross sectional view of a housing for an overvoltage device such as overvoltage device 10, 10a, 10b etc. which can be stored at least partially in a housing. For example, this housing 300 can be placed above a circuit board 400 to keep the overvoltage device 10 from interfering with this circuit board. Leads 234 and 238 can be connected to conductive surfaces 14 and 24 at a first end and then run through holes 302 and 304 in housing 300 to connect to circuit board 400 at a second end. One of the benefits of this housing is that a spark gap that is created by two conductive surfaces and the spacing between these surfaces can arc in many different regions. If the arcing from the spark gap intersects or is close to a circuit board, this arcing could alter the characteristics of this circuit board 400. For example, if the surfaces of circuit board 400 or a section of a particular plastic housing are too close to the arcing, the they may be coated with carbon from the arcing and will start to lower the breakover voltage of the spark gap. The ways to control this arcing include as described above, providing an insulative coating over a portion of the conductive material, removing a portion of the electrode material from a particular edge of the MOV, using the housing as a blocking means or mechanism, or kinking the leads which are coupled to the conductive material away from the MOV body to prevent arcing between the leads.

In at least one embodiment the spark gap is set such that it has a threshold or breakover voltage of approximately at least 3000 volts. This breakover voltage is the voltage at which the spark gap becomes operational and transfers electric current from one conductive region such as conductive region 14 to another conductive region such as conductive region 24. In all of the above embodiments, the spark gap is designed to work in both directions, that is the arcing can originate from conductive region 14 and extend to conductive region 24, or work in the opposite direction wherein the arcing originates in conductive region 24 and extends over to conductive region 14.

Accordingly, while only a few embodiments of the present invention have been shown and described, it is obvious that many changes and modifications may be made thereunto without departing from the spirit and scope of the invention.

What is claimed is:

1. An overvoltage device comprising:
 a) a first lead;
 b) a second lead;
 c) a metal oxide varistor (MOV) coupled at a first end to said first lead, and at a second end to said second lead; and
 d) a spark gap connected to said MOV, and at a first end to said first lead and at a second end to said second lead wherein said spark gap is coupled in parallel to said MOV wherein said spark gap is dimensioned as both a gap between said first lead and said second lead and an amount that said MOV extends beyond said gap between said first lead and said second lead.

2. The overvoltage device as in claim 1 wherein said first lead is a phase lead and said second lead is a neutral lead.

3. The overvoltage device as in claim 1, wherein said first lead is a phase lead and said second lead is a ground lead.

4. The overvoltage device as in claim 1, wherein said first lead is a neutral lead and said second lead is a ground lead.

5. The overvoltage device as in claim 1, wherein said MOV comprises at least two sides comprising a first side and a second side, wherein spark gap comprises at least two conductive regions spaced apart from each other by a gap, said at least two conductive regions comprising a first conductive region and a second conductive region.

6. The overvoltage device as in claim 5, further comprising at least one insulative section covering at least a portion of at least one of said at least two conductive regions.

7. The overvoltage device as in claim 6, wherein said at least one insulative section comprises at least two insulative sections and wherein said at least two insulative sections cover said at least two conductive regions.

8. The overvoltage device as in claim 6, wherein said at least one insulative section has a melting point that is below a melting point of said MOV.

9. The overvoltage device as in claim 5, wherein at least one of said at least two conductive regions are formed as a plate coupled to said MOV.

10. The overvoltage device as in claim 5, wherein at least one of said at least two conductive regions are coated on at least one side of said MOV.

11. The overvoltage device as in claim 5, wherein said first conductive region is disposed on said first side of said MOV and said second conductive region is disposed on said second side of said MOV, and wherein said second side of said MOV is spaced opposite said first side of said MOV.

12. The overvoltage device as in claim 5, wherein said at least two conductive regions are formed so that said at least two conductive regions act as said spark gap at a predetermined voltage level wherein said MOV has an energy capacity such that said predetermined voltage level to activate said spark gap is below the voltage level required to exceed the energy capacity of the MOV.

13. The overvoltage device as in claim 5, wherein a size of said MOV is adapted so that it creates a gap between said first conductive region and said second conductive region forming said spark gap such that said spark gap allows current to arc across said conductive regions at a predetermined voltage that is below a voltage which can damage said MOV.

14. The overvoltage device as in claim 1, wherein said first lead is kinked.

15. The overvoltage device as in claim 1, wherein said second lead is kinked.

16. An overvoltage device comprising:
a) a phase lead;
b) a neutral lead, wherein said phase lead and said neutral lead are each coupled at a first end to terminations and at a second end to a fault circuit;
c) a metal oxide varister (MOV) coupled at a first end to said phase lead and at a second end to said neutral lead;
d) a plurality of conductive regions disposed on said MOV, wherein said plurality of conductive regions comprise a spark gap coupled to said MOV wherein a first conductive region is coupled to said phase lead and a second conductive region is coupled to said neutral lead wherein said spark gap is coupled in parallel to said MOV across said phase lead and said neutral lead wherein said spark gap is dimensioned as both a gap between said first lead and said second lead and an amount that said MOV extends beyond said gap between said first lead and said second lead;
e) at least one insulator coupled to at least one of said first conductive region or said second conductive region.

17. The device as in claim 16 wherein said overvoltage device and said fault circuit are disposed in a single gang electrical enclosure.

18. The device as in claim 16, wherein said spark gap comprises said first conductor, said second conductor and a gap formed between said first conductor and said second conductor, and wherein said spark gap is set so that it has a breakover voltage of at least 3000 volts.

19. The device as in claim 17, further comprising a housing disposed inside of said single gang electrical enclosure, wherein at least a portion of said MOV is disposed in said housing.

20. A process for creating an overvoltage device comprising:
a) determining at least one surge parameter
b) selecting a type of MOV based upon said at least one surge parameter;
c) determining an appropriate spark gap by determining an amount of distance that two electrodes are spaced apart, and by a distance from at least one of said electrodes to a peripheral region of said MOV wherein the peripheral region extends within and beyond the gap;
d) coupling said spark gap to said MOV; and
e) electrically coupling said overvoltage device to a circuit to be protected.

21. The process as in claim 20, wherein said step of determining the appropriate spark gap comprises at least one of the following steps selected from the group consisting of:
determining a type of conductive material;
determining a set of dimensions of conductive material;
determining a spacing between at least two conductive surfaces, or
determining whether to deposit insulative material.

22. A device comprising:
a) a metal oxide varistor (MOV) comprising a body having a first surface and a second surface,
b) a spark gap electrically coupled to said MOV across said first surface and said second surface such that said spark gap is disposed along a periphery of said body wherein the body extends within and beyond the gap.

* * * * *